United States Patent [19]

Henery

[11] 4,344,986
[45] Aug. 17, 1982

[54] METHOD OF DELIVERING POWDER COATING REACTANTS

[75] Inventor: Vern A. Henery, Pittsburgh, Pa.

[73] Assignee: PPG Industries, Inc., Pittsburgh, Pa.

[21] Appl. No.: 176,322

[22] Filed: Aug. 8, 1980

[51] Int. Cl.³ .................. B05D 1/12; C03C 17/23
[52] U.S. Cl. .................. 427/180; 65/60.52;
427/108; 427/110; 427/160; 427/164; 427/165;
239/8; 427/168
[58] Field of Search ............ 427/110, 160, 164, 168,
427/180, 108, 165; 65/60 D, 60.52

[56] References Cited

U.S. PATENT DOCUMENTS

| | | | |
|---|---|---|---|
| 3,660,061 | 5/1972 | Donley et al. | 65/32 |
| 3,852,098 | 12/1974 | Bloss et al. | 117/106 |
| 4,172,159 | 10/1979 | Marcault | 427/110 X |
| 4,182,783 | 1/1980 | Henery | 427/248 |
| 4,230,271 | 10/1980 | Marcault | 118/308 X |

Primary Examiner—James R. Hoffman
Attorney, Agent, or Firm—Donna L. Seidel

[57] ABSTRACT

A method is disclosed for depositing a coating from a turbulent gaseous stream of a powder coating reactant delivered to a substrate surface through a slot-shaped nozzle.

8 Claims, 1 Drawing Figure

POWDER SPRAY SYSTEM

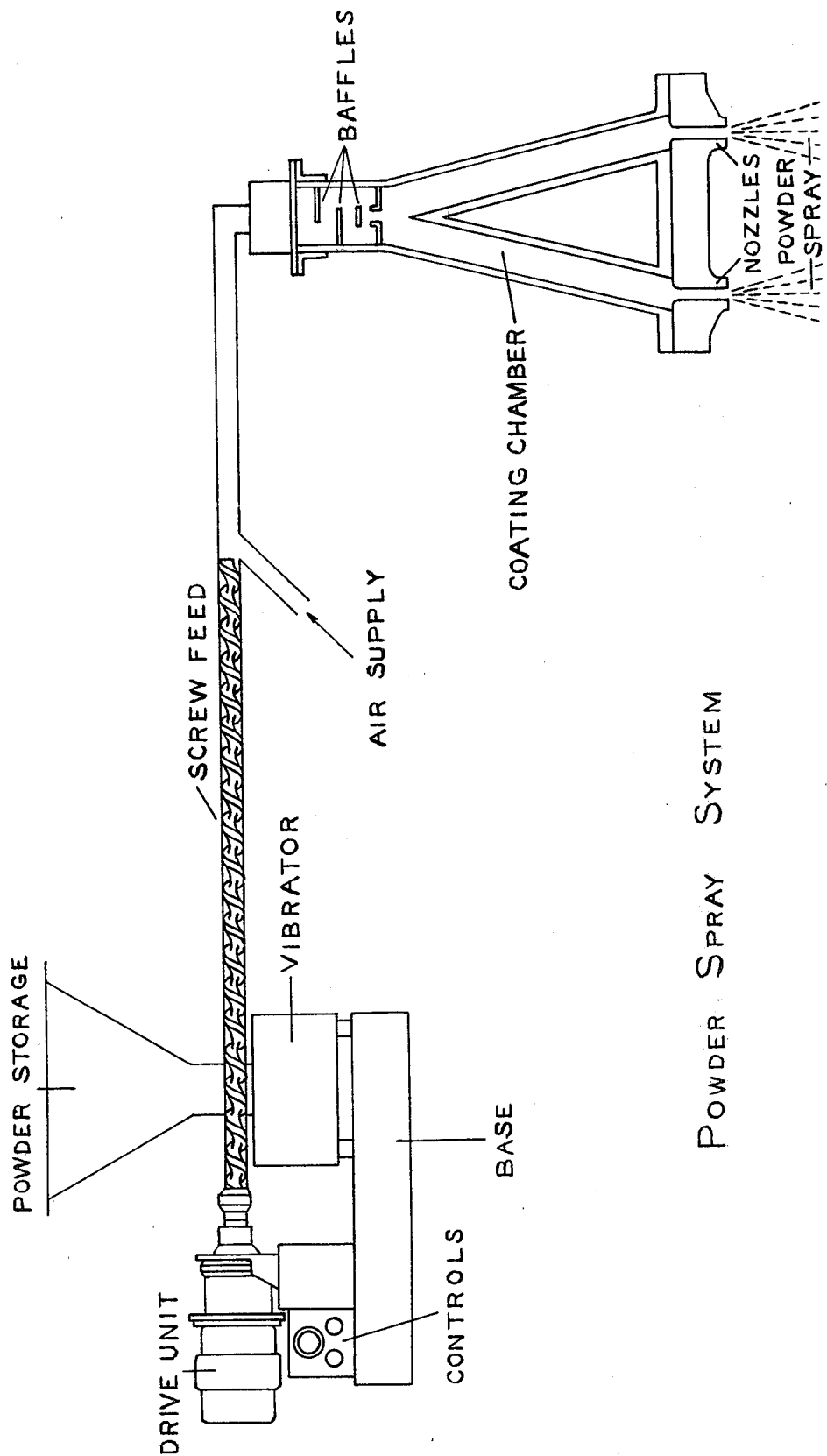

METHOD OF DELIVERING POWDER COATING REACTANTS

BACKGROUND OF THE INVENTION

1. Field of the Invention

This invention relates generally to the art of depositing a coating on a substrate, especially a glass substrate, and relates more particularly to the art of depositing a coating from a powder coating composition.

2. The Prior Art

Various methods of coating glass with metal or metal oxide films are well-known in the art. A technique for depositing a variety of metal oxide films onto a hot glass surface in a continuous float glass ribbon environment is described in U.S. Pat. No. 3,660,061 to Donley et al. A mixture of organometallic compounds in organic solution is sprayed onto a glass surface at a temperature high enough for thermal reaction of the organometals to form a metal oxide film. This technique produces durable metal oxide films having desirable aesthetic and solar energy control properties. Although the use of large volumes of solvent results in rapid cooling of the glass, more significant disadvantages are the health, safety and environmental effects.

These disadvantages may be abated by elimination of the organic solvent. A method for solventless chemical vapor deposition of coatings from vaporized powder coating reactants is described in U.S. Pat. No. 3,852,098 to Bloss et al. A powder coating reactant is dispersed into a hot stream of gas, vaporized, and conveyed to the surface to be coated, which is maintained at or above the temperature at which the coating reactant pyrolyzes to deposit a film. Although the disadvantages of a solvent system are avoided, vaporization of the coating reactant requires high temperatures, with the possibility of premature thermal reaction of the coating reactant.

Another method of vapor deposition is described in U.S. Pat. No. 4,182,783 to Henery, wherein a solid particulate coating reactant is fluidized by introducing a volume of fluidizing gas through a mass of reactant. The fluidized mixture of coating reactant and gas is diluted with an additional volume of gas prior to delivery to the surface of the substrate to be coated. An apparatus for carrying out the technique of fluidizing a bed of solid particulate coating reactant is illustrated in U.S. Pat. No. 4,182,783 and is claimed in U.S. Pat. No. 4,297,971.

A method which avoids the health, safety and environmental problems of a solvent-based coating method, the high-temperature vaporization risks of a vapor deposition method, and the complexity of a fluidized bed powder coating method is the subject matter of the present invention.

SUMMARY OF THE INVENTION

The present invention provides a method of and apparatus for dispersing powder coating reactants in a carrier gas stream and delivering the powder coating reactant uniformly to the surface of a substrate to be coated. A powder coating reactant is mixed with a carrier gas stream. Turbulence of the mixture is obtained by means of at least one baffle to maintain uniform distribution of the powder coating reactant in the carrier gas en route to the substrate to be coated. The powder coating reactant is delivered to the surface of the substrate through a nozzle positioned a short distance from the surface to be coated. The length of the nozzle is typically greater than its width, preferably substantially equal to the parallel dimension of the substrate, and is generally disposed perpendicular to the direction of a relative motion between the slot and the substrate.

DESCRIPTION OF THE DRAWINGS

The FIGURE illustrates the powder spray coating system of the present invention. Powder coating reactant is fed into the system and mixed with air. As the mixture enters the coating chamber, the baffle creates turbulence which keeps the powder uniformly distributed in the mixture until it is delivered through the slot-shaped nozzle to the surface to be coated.

DESCRIPTION OF THE PREFERRED EMBODIMENTS

A substrate to be coated, preferably a sheet of glass, is maintained in a preferably horizontal position in a coating environment. In a particularly preferred embodiment, the substrate is maintained in an oxidizing atmosphere at a temperature sufficient to pyrolyze a coating reactant to deposit a metal oxide film on the surface of the substrate.

A coating reactant is obtained in the form of a powder, preferably of fairly uniform size distribution of about 500 to 600 microns or less. Coating reactants useful in accordance with the present invention include metal beta diketonates and other organic metal salts such as acetates, hexanoates, formates and so on. Organometallic compounds such as alkyl and aryl tin halides, particularly alkyltin fluorides, may also be used. Halogenated acetonates and acetylacetonates, preferably mixtures of metal acetylacetonates, are preferred.

Preferably, acetylacetonate coating reactants are milled and/or sifted to obtain a relatively uniform size distribution. A powder comprising particles having an average diameter of about 500 to 600 microns or less is especially desirable. Such a powder coating reactant has physical properties similar to the properties of flour. The powder coating reactant, in bulk form, is mixed with a carrier gas, preferably air, and preferably at ambient temperature. The powder coating reactant may be injected, blown or aspirated into the carrier gas stream. While any means for mixing the powder coating reactant and carrier gas is suitable, a preferred means is an aspirator having a vacuum ejector mounted within it.

The carrier gas may be maintained at any temperature below the decomposition temperature of the coating reactant, preferably below its vaporization temperature, and most preferably ambient temperature, thereby minimizing the risks of coating reactant decomposition which can decrease the efficiency of vapor deposition methods. The distribution of powder coating reactant in the carrier gas is kept substantially uniform en route to the substrate by the creation of turbulence by means of a baffle or a series of baffles as shown in the drawing.

The uniform mixture of powder coating reactant and carrier gas is delivered to the surface to be coated through a slot-type nozzle, defined for purposes of the present invention as having a length substantially greater than its width. The slot is preferably no more than ⅛ inch wide, and preferably is as long as the parallel dimension of the surface to be coated to enhance the uniformity of the coating. The slot is preferably disposed perpendicular to the direction of relative motion between the nozzle and the surface to be coated. A large stationary substrate may be coated by using one or more moving nozzles, or the substrate may travel past one or more stationary nozzles. The nozzle is preferably positioned ½ inch or less from the surface to be coated, thereby creating a back pressure that promotes uniform flow of the carrier gas/coating reactant mixture along the length of the slot to further enhance the uniformity of the coating.

The carrier gas/coating reactant mixture contacts the surface to be coated to deposit a film. Preferably, the carrier gas/coating reactant mixture contacts a glass surface at a temperature sufficient to pyrolyze the coating reactant to form a metal oxide film, typically 950° to 1050° F. (about 510° to 566° C.). Exhaust hoods draw unreacted powder away from the surface. The powder is easily recovered for reuse, thereby optimizing the efficiency of this method.

The thickness of the film may be controlled by varying the rate of relative motion between the nozzle and substrate, by adjusting the flow rate of the carrier gas/coating reactant mixture, by increasing or decreasing the concentration of coating reactant in the carrier gas or by raising or lowering the substrate temperature.

The present invention will be further understood from the description of specific examples which follow.

EXAMPLES

A freshly formed float glass ribbon travels at a line speed of about 360 inches per minute (about 9.1 meters per minute) past a stationary coating apparatus as shown in the drawing. Powder coating reactant is fed at a rate of 150 to 200 grams per minute into a stream of air delivered at rate of 30 cubic feet (0.85 meter) per minute. Turbulence is created in the powder/air mixture by a baffle at the entrance of the coating chamber. The power/air mixture is delivered through a slot-shaped nozzle 1/16 inch (about 1.6 millimeters) wide and substantially as long as the width of the glass ribbon. The nozzle is positioned ⅜ inch (about 9.5 millimeters) from the glass surface to provide a back pressure which helps to maintain uniform distribution of the powder coating reactant. The glass surface is at a temperature of about 1050° F. (about 566° C.). A uniform metal oxide coating is deposited on the glass surface. The following metal acetylacetonates were successfully used as coating reactants.

| Example | Metal Acetylacetonate |
| --- | --- |
| I | Cobalt |
| II | Chromium |
| III | Iron |
| IV | Nickel |
| V | Copper |

-continued

| Example | Metal Acetylacetonate |
| --- | --- |
| VI | Copper/Chromium |
| VII | Cobalt/Iron/Chromium |
| VIII | Manganese/Copper |
| IX | Iron/Copper/Chromium |

EXAMPLE X

A coating is prepared as in the previous examples with dibutyltin difluoride as the powder coating reactant. A uniform tin oxide film having a surface resistivity of 8 to 10 ohms per square is formed.

The above examples are offered to illustrate the present invention, the scope of which is defined by the following claims.

I claim:

1. In a method of coating a substrate with a film by contacting a surface of the substrate with a powder coating reactant which comprises the steps of:
   a. dispersing said powder coating reactant in a carrier gas stream;
   b. delivering the powder coating reactant/carrier gas mixture to a coating chamber; and
   c. delivering the powder coating reactant/carrier gas mixture from the coating chamber to the surface to be coated the improvement which comprises creating turbulence in the powder/gas mixture by means of at least one baffle at the entrance of the coating chamber.

2. The method according to claim 1, wherein the coating reactant powder has an average particle size of about 500 microns.

3. The method according to claim 1, wherein the powder coating reactant is dispersed in a carrier gas at ambient temperatures.

4. The method according to claim 3, wherein the carrier gas is air.

5. The method according to claim 1, wherein the powder coating reactant/carrier gas mixture is delivered to the surface to be coated through a slot-shaped nozzle.

6. The method according to claim 5, wherein the slot-shaped nozzle is not more than ⅛ inch wide and is substantially as long as the parallel dimension of the surface to be coated.

7. The method according to claim 1, wherein the substrate is contacted with the coating reactant/carrier gas mixture at a temperature sufficient to pyrolyze the coating reactant.

8. The method according to claim 7, wherein a turbulent stream of powder metal acetylacetonate in air is delivered to the surface of a glass substrate to deposit a metal oxide film.

* * * * *